US007660772B2

(12) United States Patent
Verkama

(10) Patent No.: US 7,660,772 B2
(45) Date of Patent: Feb. 9, 2010

(54) AUTHENTICATION IN A TELECOMMUNICATIONS NETWORK

(75) Inventor: Markku Verkama, Espoo (FI)

(73) Assignee: Nokia Corporation, Espoo (FI)

( * ) Notice: Subject to any disclaimer, the term of this patent is extended or adjusted under 35 U.S.C. 154(b) by 873 days.

(21) Appl. No.: 09/751,138

(22) Filed: Dec. 29, 2000

(65) Prior Publication Data

US 2001/0005840 A1    Jun. 28, 2001

Related U.S. Application Data

(63) Continuation of application No. PCT/FI99/00593, filed on Jul. 2, 1999.

(30) Foreign Application Priority Data

Jul. 7, 1998    (FI) ..................................... 981564

(51) Int. Cl.
*G06F 17/60* (2006.01)

(52) U.S. Cl. ............................ 705/67; 705/64; 705/50; 705/51

(58) Field of Classification Search ................... 705/67, 705/64, 50, 51; 713/165
See application file for complete search history.

(56) References Cited

U.S. PATENT DOCUMENTS 5,311,596 A * 5/1994 Scott et al. .................... 380/33

(Continued)

FOREIGN PATENT DOCUMENTS

EP      0912017 A2    4/1999

(Continued)

OTHER PUBLICATIONS

Upkar Varshney, *Supporting Mobility with Wireless ATM*, Internet Watch, Jan. 1997.

(Continued)

*Primary Examiner*—Pierre E Elisca
(74) *Attorney, Agent, or Firm*—Harrington & Smith, PC

(57) ABSTRACT

The invention relates to an authentication method intended for a telecommunications network, especially for an IP network. From a terminal (TE1) in the network a first message (RR) containing an authenticator and a data unit is transmitted to the network, the data unit containing information relating to the manner in which the authenticator is formed. For carrying out authentication in the network, the data unit contained in the first message is used for determining a check value, which is compared with the said authenticator. To make it unnecessary for the terminal to perform any complicated and heavy exchange of messages when attaching to the network and for still obtaining the desired security characteristics for use, such an identification unit is used in the terminal which receives as input a challenge from which a response and a key can be determined essentially in the same manner as in the subscriber identity module of a known mobile communications system, a set of authentication blocks is generated into the network, of which each contains a challenge, a response, and a key, whereby the generation is performed in the same manner as in the said mobile communication system, at least some of the challenges contained by the authentication blocks are transmitted to the terminal, one of the challenges is chosen for use at the terminal, and, based on it, a response and key for use are determined with the aid of the terminal's identification unit, in the said first message (RR) the network is notified with the aid of the said data unit of which key corresponding to which challenge was chosen, and the authenticator of the first message and the said check value are determined with the aid of the chosen key.

35 Claims, 9 Drawing Sheets

U.S. PATENT DOCUMENTS

| | | | | |
|---|---|---|---|---|
| 5,442,342 | A | * | 8/1995 | Kung .................... 340/5.27 |
| 5,668,875 | A | * | 9/1997 | Brown et al. ............ 380/248 |
| 5,689,563 | A | * | 11/1997 | Brown et al. ............ 380/247 |
| 5,729,537 | A | | 3/1998 | Billstrom |
| 5,864,757 | A | | 1/1999 | Parker |
| 5,991,407 | A | * | 11/1999 | Murto .................... 380/248 |
| 6,076,163 | A | * | 6/2000 | Hoffstein et al. ......... 713/168 |
| 6,167,279 | A | * | 12/2000 | Chang et al. ............ 455/462 |
| 6,219,793 | B1 | * | 4/2001 | Li et al. ................. 713/202 |
| 6,377,691 | B1 | * | 4/2002 | Swift et al. ............. 380/277 |
| 6,427,073 | B1 | * | 7/2002 | Kortesalmi et al. ...... 455/414.1 |
| 6,772,336 | B1 | * | 8/2004 | Dixon, Jr. ............... 713/165 |
| 6,802,600 | B2 | * | 10/2004 | Park ...................... 347/85 |
| 6,909,708 | B1 | * | 6/2005 | Krishnaswamy et al. .... 370/352 |
| 7,145,898 | B1 | * | 12/2006 | Elliott ................... 370/352 |
| 2002/0069174 | A1 | * | 6/2002 | Fox et al. ............... 705/52 |
| 2004/0093493 | A1 | * | 5/2004 | Bisbee et al. ........... 713/156 |

FOREIGN PATENT DOCUMENTS

| | | | |
|---|---|---|---|
| JP | 2004242142 A | * | 8/2004 |
| WO | WO 97/45814 | | 12/1997 |
| WO | WO 98/32301 | | 7/1998 |
| WO | WO 98/44402 | | 10/1998 |

OTHER PUBLICATIONS

C. Perkins, editor, Network Working Group, *rfc2002.txt*, Oct. 1996.

International Search Report for PCT/FI99/00593.

\* cited by examiner

Example 1:

Example 2:

Example 3:

Example 4:

AUTHENTICATION IN A TELECOMMUNICATIONS NETWORK

This application is a continuation of international application serial number PCT/FI99/00593, filed on Jul. 2, 1999 AUTHENTICATION IN A TELECOMMUNICATIONS NETWORK.

BACKGROUND OF THE INVENTION

1. Field of the Invention

This invention relates to systems for purchase and bill payment transactions and transferring of electronic cash and also terminal-to-terminal wireless transmission of the required data without using modem.

2. Description of the Related Art

The WO96/04618 publication has disclosed a terminal which can perform purchase payment and bill transactions via a modem coupled to or integrated into the terminal. The whole system provided in above publication is a modem-based system where the user's credit card information and the terminal's serial number are sent to a host computer for validating which after authorization by card issuing authority and a host computer the user is given the right for remote purchases. In its portable form the terminal also uses modem which is coupled through the telephone circuit to a transmitter/receiver. The portable terminal is not a wireless/cellular terminal so it does not exploit the wireless messaging for direct communication but the terminal is by means of a modem and circuit-switched call connected to a host computer and the payment procedure is performed during the established call. Moreover, in the above system transaction requests are connected to the remote host system through telephone line and the system is based only on circuit-switched communications whereby the credit card validation is performed during an established continues call. Furthermore the above-like systems does not utilize electronic cash for purchase or bill transactions.

The GB2276258 publication disclose a system for utilizing credit information to verify and accept payment for an order on site at the door of a home contemporaneously by means of credit card. The above system is also a modem-based system and is based on circuit-switched communications neither messaging means of wireless communication for purchase and payment transactions. Neither the above system uses electronic money for payment transactions. In all already known methods the user establishes a circuit-switched call for performing transaction during the established call.

In the above-like systems the communication speed is low because of using modems or data cards which also makes the terminals more expensive. The communication is also expensive for the user because of the circuit-switched calls and the user, in some cases, is also required to purchase a separate terminal for his purchases or bill payment transactions. Furthermore the user's credit information (credit card number) communication over the open networks is not secured. In all existing systems it is the customer whose credit card number is taken by the service provider for charging the customer whereas in a secure payment system the customer is not required to give any credit information to the third parties. There continues to exist a need to further improve the efficiencies of the payment systems.

SUMMARY OF THE INVENTION

It is an object of this invention to provide a secure payment system wherein the payer takes the account/contact number of the payee in order to pay to the payee's terminal or account. It is another object of this invention to provide a wireless/cellular terminal which can perform purchase payment and bill payment transactions and be used as the use's electronic wallet. It is another object of this invention to provide a wireless/cellular terminal to allow users the ability to conveniently and remotely in a connectionless way perform these financial transactions and send and receive electronic money on terminal-to-terminal basis (as wallet-to-wallet) without using the network for transferring the required cash. It is another object of this invention to provide a wireless/cellular digital terminal to allow smart card holders to also remotely perform these financial transactions and also terminal-to-terminal transferring of electronic money. In this invention in order to prevent forgery the payee's account number, whereto the founds can be transferred, is delivered to the payer and not the payer's account number to the payee, which could easily be used by unauthorized users.

It is another object of this invention to provide a service as an expansion of value-added data services of currently existing mobile communications systems. It is another object of this invention to utilize the wireless or cellular terminals such as mobile phones, pagers etc. to be used as the inventive terminal (Mobile Wallet-Phone) thus creating a high value added service for mobile communication and providing the users one terminal which can be used as mobile telephone or pager when needed and as user's electronic wallet when required. Another object of this invention is to provide for wireless or cellular connectionless messaging with a remote host computer without establishing a circuit switched call.

It is yet another object of this invention to provide a connectionless method for terminal-to-terminal transmission of electronic money and payee's details such as contact code or number, account code or number, and bill without contacting the payee. It is another object of this invention to provide a connectionless method for broadcasting the payee's/service provider's details such as account number, contact codes, and the payable bill to the user's terminals continuously or whenever required. It is yet another object of this invention to provide a method to send a bill format to the user's terminals in a connectionless way and whenever user requests it, to be filled and sent back to the required host computer or another terminal. It is yet another object of this invention to provide a terminal which is able to communicate with another terminal directly and without using the network for transmission of the required data. It is another object of this invention to provide a terminal which is able to configure an adjustable radio coverage area (e.g. between one millimeter to five meter) for terminal-to-terminal wireless and modemless data transmission.

According to one embodiment of this invention, a wireless terminal, such as SIM-operated (SIM: Subscriber Identification Module) portable terminals such as mobile phones or pagers, portable wireless personal computers can perform terminal-to-terminal remote purchase payment transactions, transferring of electronic money and user's details such as account number, contact code, address etc. in a connectionless way without requiring that the payee/payer contact each other or establish a circuit-switched call. The terminal includes means for receiving/transmitting of required information in a terminal-to-terminal wireless data communication without using the network for transmission the information. The terminal can produce a small and adjustable radio coverage area wherein the terminal-to-terminal sending of the user details and transferring of electronic money and other information can be done using wireless messaging and in a transparent way to other terminals/users. In another embodiment of the invention the wireless/cellular terminal or service provider's terminal (such as cash register, computer etc.) or base station broadcasts the payee's/service provider's account and bill information to all or to the required users' terminal which are under the radio coverage of the payee's/ service provider's terminal/base station. Then the payer's terminal monitors the transmitted/broadcasted information which after the user activates the payee's details and sends the bill and the payee's details and when needed the required electronic money (telecash) to the payee's terminal or account at the host computer. In another embodiment of this invention the user, by sending a message, can request the host computer or the payee's terminal to send the bill or bill format to the payer's terminal, in a connectionless way (using for example internet or short massaging means of mobile networks). Then user accepts the bill or fills in the bill format (a bill inquiry) the required information (together with the required amount of telecash, when needed) and sends it back to the host computer or the payee's terminal for receiving/ accepting or performing the bill.

In this invention the user's details such as account number, contact codes, numbers are sent or broadcasted to other terminal, directly or via base stations, or via network, in order to be used by payers for remote purchase transactions, bill payment, transferring of telecash and other required data from terminal-to-terminal or between the terminals and host computer.

Other objects and many of the attendant features of this invention will be more readily appreciated as the same becomes better understood by reference to the following detailed descriptions and considered in connection with the accompanying drawings in which like reference symbols designate like parts throughout the figures.

DETAILED DESCRIPTION

Figure 1:
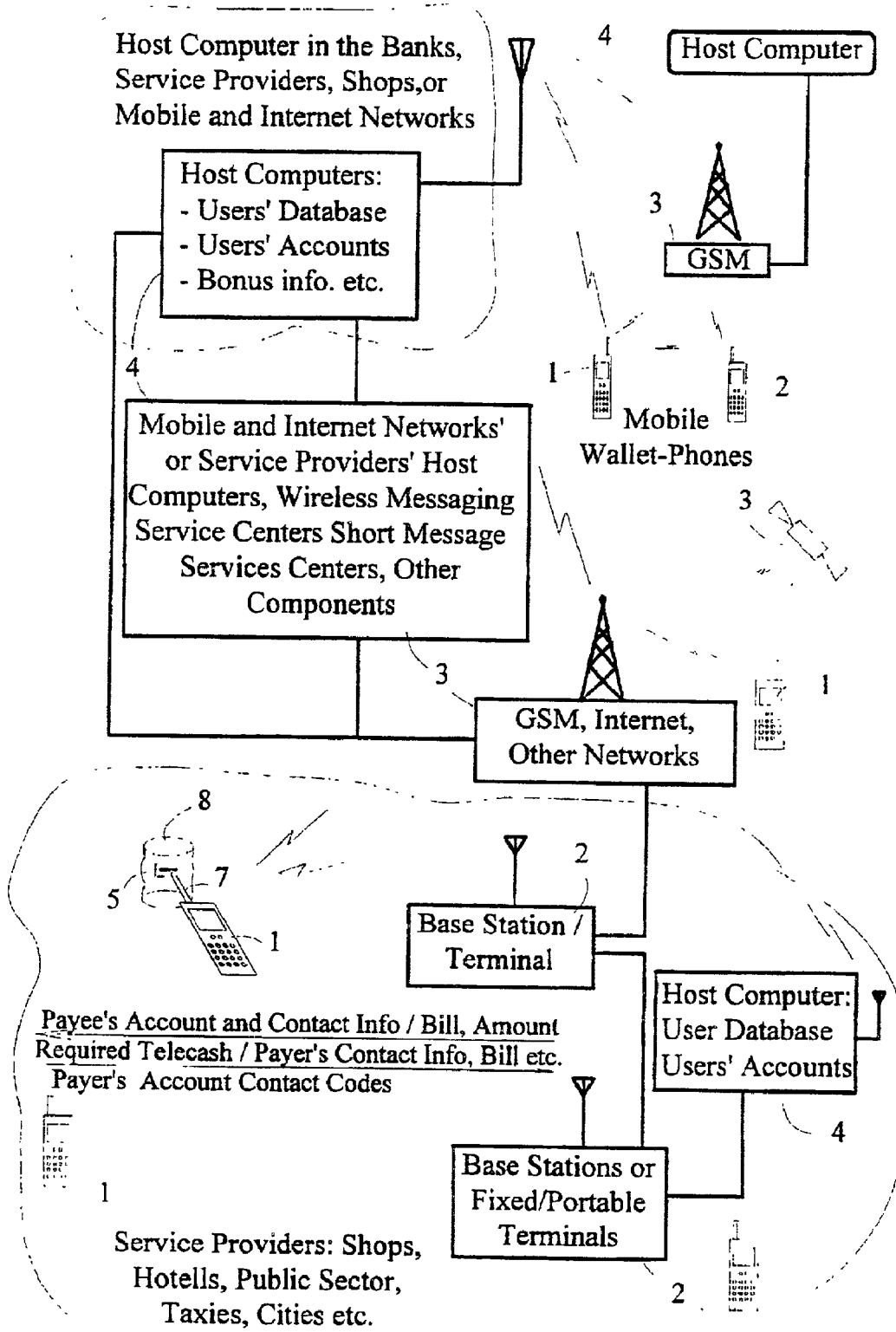
FIG. 1 illustrates a general overview of the system including cellular/wireless and internet network, host computers and Mobile Wallet-Phones utilized in the invention.

Referring now to the drawings, and more particularly, to FIG. 1, there is shown a block diagram of the overall system including cellular/wireless and internet networks (3), host computers (4) and user's wireless/cellular terminals "Mobile Wallet-Phones" (1, 2) or fixed terminals/base stations (2) in accordance with the invention. The terminal (1, 2) is able to send and receive the required account numbers, contact codes, telecash, bills and bill format and the products' details (such name and price) in a connectionless way either without using the network (3) or via the network. The base stations of the network (3) or service providers (2) are also arranged so that they send the required information for purchase and bill payment transactions, such as the payee's account number or codes, and bill format to the users terminal (1) continuously or whenever required. For example when the user terminal is under the coverage of base station (2) the network/base station broadcasts/sends the payee's/service provider's name and account number to the payer's terminal. Then the payer's Mobile Wallet-Phone (hereinafter MWP) monitors the payee's account number, contact code etc. (hereinafter payee's detail), then the user selects/activates the required payee's details which may be allocated for a specific service such as parking and send the bill and (or required telecash to the payee's terminal (2) or account (4) directly or via base station or via network. The payee's and payer's MWPs and fixed/ portable terminals (1, 2) can exchange information, send and receive required amount of telecash directly to each other without the involvement of the network or host computer (4). The host computer (4) includes, as much as required, the users' details, data, accounts, the service provider's details etc. When the user purchases something for example in a shop by means of his/her MWP, the seller's terminal can send the bill and payment to the host computer (4) where users have accounts. The host computer (4) takes the required bonuses into account so that the user does not require to have a different bonus card in order to give to the seller for storing the (gained) bonus in the customer's account but the required bonus can be stored in his account while shopping is done by his MWP without requiring a separate bonus card. The network (3) can be a terrestrial or satellite network. The mobile wallet-phones (1, 2) are wireless/cellular, either terrestrial or satellite or both, single mode/band, dual mode/band or multimode/multiband terminals/phones or pagers, transmitter/ receivers which can also whenever required configure their own radio coverage area under which they can send and receive the required information and telecash to/from each other without using the network. Alternatively by means of terminals (1, 2) the user can request the network/host computer or other terminal to send a bill format which includes at least one question which can be answered (filled in) by user and sent back to the required host computer or other terminals. The host computer also takes into account the currency by which a bill or purchase has been performed so that when the host computer (4) receives the bills and payments from a payer's terminal, it checks the received information, the currency unit of the telecash or checks the payer's/payee's accounts in order to define by which currency the amount should be paid to the payee's account. The exchange of the money is done in a real time and then both the payee's/payer's terminals are acknowledged by a short message. In FIG. 1, there is also shown that the user's terminal (1) is able to monitor (receive) the product's (8) details (such as name, price and other required information needed to perform the bill payment) from a tag/card or label (5) which is labeled or by other means connected/printed on the product package (for example a can of mushrooms). The tag or card (5) can be a microprocessor loaded with the required details and which is also able to radiate/transmit the required details over a very small area (for example 1 millimeter). The tag or card (5) can be also made from an environment-friendly radiating material and loaded with the required product's details (i.e. the information which is broadcasted/radiated with a very small radio coverage). When the tag/card (5) is (for example) touched by the antenna (7) of user's terminal (1) the terminal receives and monitors the product's details. The user can pay for the selected product (5) by sending the product's details (and when needed, the required amount of telecash to the cash register, shop keeper's terminal (2) or host computer (4) or to the host computer of the bank wherein at least the customer (payer) has an account which can be debited/charged for the purchase performed. Alternatively the user's terminal (1) can be integrated with an electronic and digital (image) camera by which the bar codes (5) of a product (8) can be read (transferred into the terminal as an image or black and white code) in order to select the product user wants to buy and pay for, without requiring to use any infrared reading devices. This application of the present invention can be seen as the best killer application for terminals having digital image processing means. Although several inventions has been made to provide mobile phones with digital camera's features or providing video telephony in mobile phones but because of the lack of good applications such products cannot have a widespread market in the near future. For example the willingness of people to participate in video telephony has been seen as a barrier for mass production of video telephony products. But shopping by means of a mobile phone integrated with an appropriate camera can be seen as a killer application for mobile phones having digital image or mobile video telephony features. For example in FIG. 1 the payer's terminal (1) can be integrated with a micro or nano digital camera in order to read the product's (8) bar codes (5) (or any other information including the product's details and price) and transfer them to the terminal (1) wherein the product details can be monitored on the screen of the user's terminal, and the terminal further arranges the product details in a shopping list on the screen. Then the user can send the bill and payment to the payee, as mentioned above, or cancel the list or an item from it, if he does not want to buy the selected product.

Figure 2:
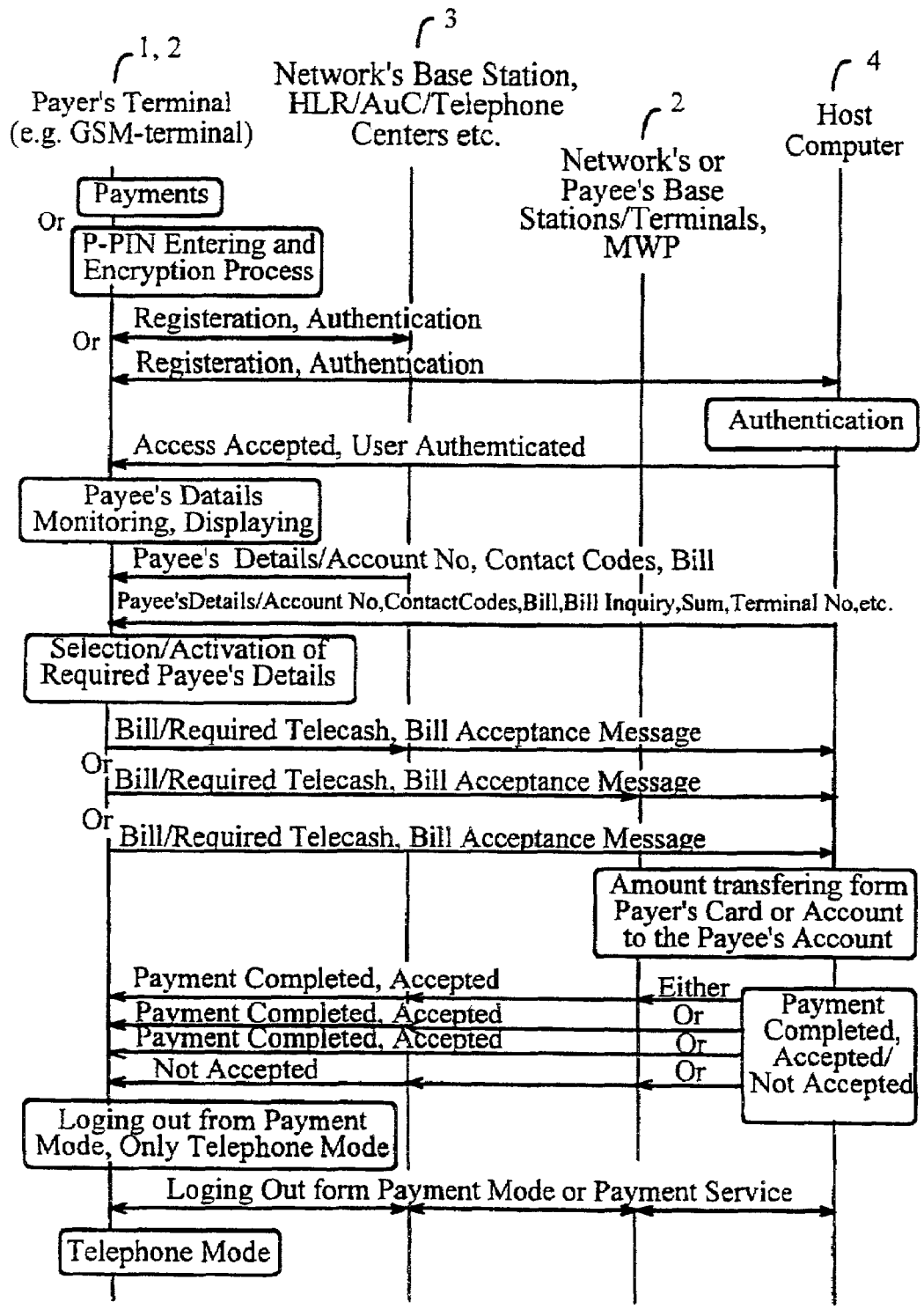
FIG. 2 is a flow chart presenting the user authentication, sending the payee's details, bills, bill inquiry, performing the transactions, sending the required amount of telecash to the payee's terminal/account in accordance to the present invention.

FIG. 2 presents a flow chart, where is shown that the MWP's user is authenticated by means of an additional code called P-PIN (Personal-Payment Identification Number) if a PIN is already used for telephone services. The user can use the same number for both PIN and P-PIN in order to remember it better. In one embodiment of this invention, first the MWP operates as the user's telephone i.e. the user has entered his/her PIN-code to the terminal for access to the network (3) for telephone services so that the MWP is in the telephone mode. According to the invention in order to provide a secure payment device and method the user is prompt to enter in addition to the PIN code another code, P-PIN, for using his mobile phone as a payment device, when required. After entering the P-PIN the mobile phone becomes a mobile wallet-phone so that it can be used both as a mobile phone and as the user wallet, thus Mobile Wallet-Phone. After that the P-PIN has been entered or spoken by user to his terminal (1, 2) an authentication procedure takes place either in the terminal (1, 2) and user's smart card (e.g. SIM) or between the terminal i.e. smart card (SIM) and network/host computer.

The user can also be registered and authenticated in network's AuC (Authentication Center) HLR (Home Location Register) or other future intelligent component of the network or in the host computer. When the user is authenticated either in MWP (1) or network/host computer (3, 4), the user can perform teleshopping, bill payment and purchase transactions and exchange money with other terminals (1, 2) or host computer (4). In order to receive the payee's details (i.e. account number, contact number etc.) the user can activate a function such as "payments" or "service provider" in his terminal (1, 2) either before authentication or after or without authentication. Then the terminal (1, 2) monitors the payee's terminal's/base station's broadcasting/transmitting details or the payer by sending a message requests the payee's terminal (2) or host computer (4) to send the required information such as payee's details, bill format etc. needed to perform the purchase or bill payment. Then the payer can enter the required information, if necessary, such as transaction's amount and send the bill (either including the required telecash or without it) to the payee's account which can be in the payee's terminal/MWP (2) or in the host computer. If the bill/payment is sent to the host computer (4), the host computer either transfer the received telecash to the payee's account or debits the payee's account for the amount which should be paid to the payee's account. Then the payee's/payer's terminals are acknowledged about the completion of the payment by sending a message to both terminals. The user's account or contact numbers/codes can be a telephone number or a contact code allocated for user in order to receive and send bills and payments. The user's account or contact numbers/codes can be same a his telephone number or internet address used for sending and receiving bills and payment messages according to this invention. Alternatively, a different code or number can be used for this purpose. User can have a different user data in SIM for registration and authentication into his terminal or host computer or network's components (e.g. HLR, AuC) for the inventive payment service, or the same user data used for telephone services can be used for user registration or authentication, if required.

When the user does not want to perform purchase transactions, bill payments, exchange or transfer telecash, the terminal (1) can be used only as a telephone i.e. the MWP operates only as a mobile phone for example by activating a required function (for example "log-out" from the wallet-mode or "close the wallet" or by activating an icon presenting a wallet shown on the corner of the terminal's display). Therefore, if the terminal is stolen, its' owner should not be worried about his money or account since only the authorized user has the required P-PIN code in order to use his mobile phone as Mobile Wallet-Phone.

Figure 3:
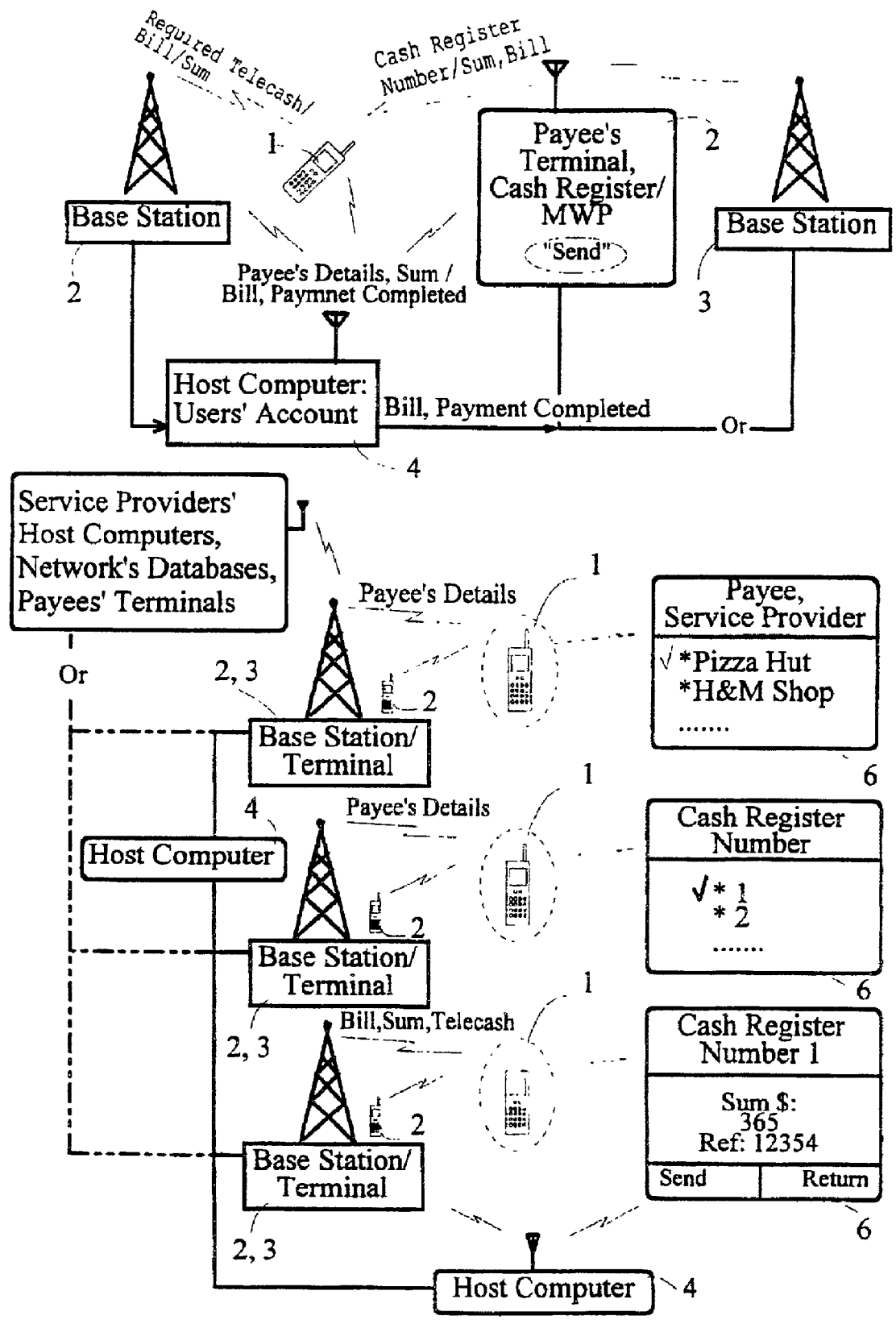
FIG. 3 is a terminal-to-terminal or base station-to-terminal or host computer to-terminal messaging of the payee's details, purchase and bill payment transaction messaging, and transferring of electronic money in a service provider environment in accordance with the present invention.

FIG. 3 shows one embodiment of the present invention in a service provider's environment. The service provider's base stations or terminals (2) or host computer (4) broadcast or send whenever required the payee's/service provider's details, bill format, bill, the sum which should be paid by payer and other required information for performing the payment. Alternatively the above-mentioned information can be requested through the payer's terminal (1) by sending a message to the payee's terminal directly or through the network/base stations or they can be requested from the host computer. The payee's details can include payee's account number, contact code (such as .PizzaHut.com), the service provider's cash register's number (i.e. contact code, account number etc.). The required information is then monitored (6) by the payer's MWP (1). Then the payer activates the payee's details upon which MWP sends the required payment/bill to the payee's account kept in payee's terminal (2) (SIM card) or in the host computer (4).

Figure 4:
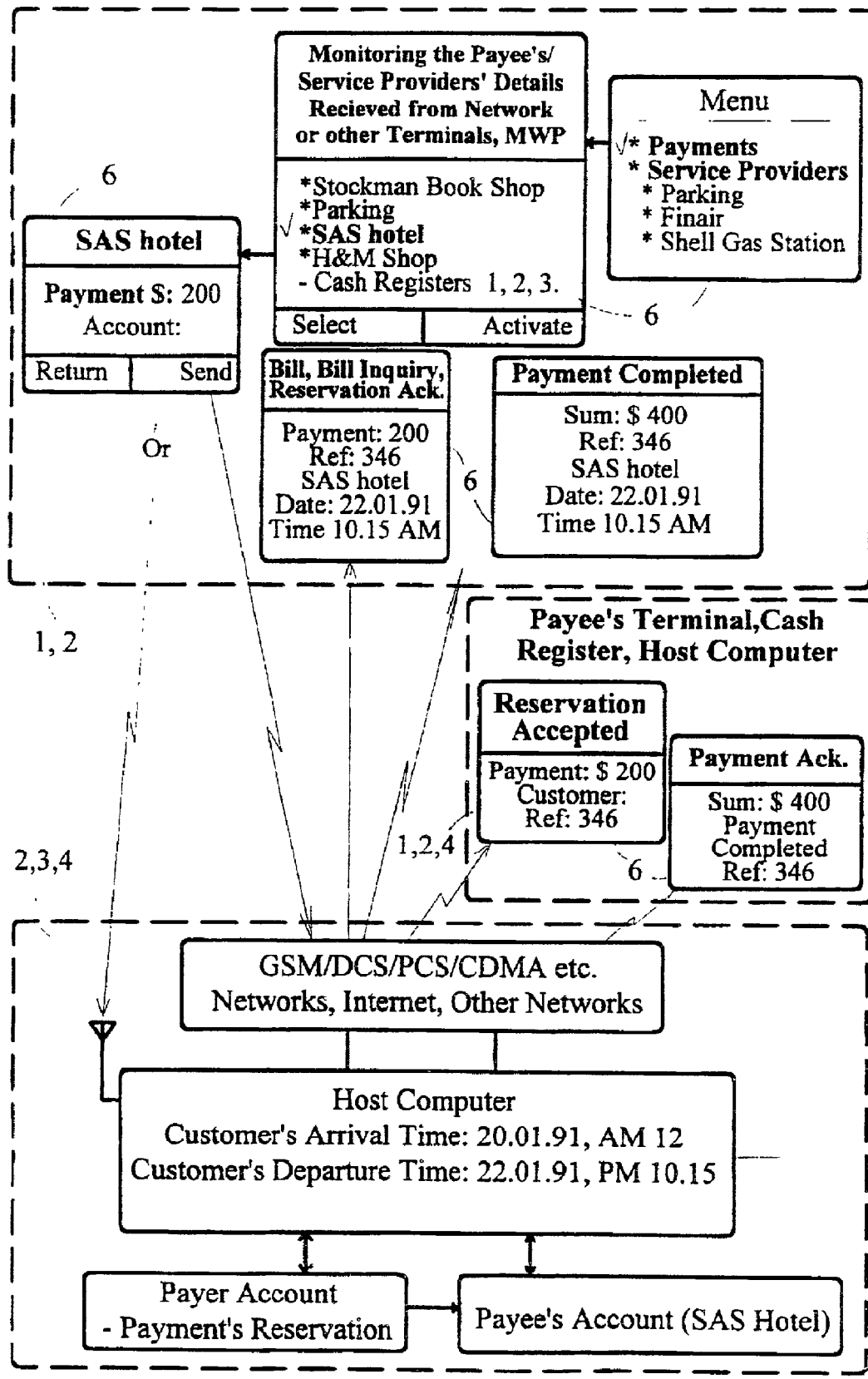
FIG. 4 is a flow chart between the payer's terminal, host computer and the payee's terminal.

FIG. 4 presents another example of the payment method according to the present invention. The payer's MWP (1) monitors the payee's/service provider's details transmitted/broadcast over the air interface in a connectionless way (payer does not need to contact the payee). After that the payer has activated the required command for example "service provider" (or a number or button) his MWP monitors the available service providers' details. Monitoring of the service provider's details depends on the radio coverage of the service providers' base stations/terminals and payer's MWP's radio coverage area. For example service provider's terminal/base station (2) can broadcast/send the required information in a 1 to 5 meter (or more or less) configured radio coverage area (which can be adjustable). When the payer's MWP is under such coverage, it can receive the service provider's/payee's details. The required coverage can be adjusted for example from 1 millimeter to few meters or more (depending on the application). In this way only the payer and payee can exchange information, payments without using the network. Furthermore a signaling protocol can take place between the terminals for precise terminal to terminal communication. According to this embodiment of the present invention the exchange of information and payments takes place terminal-to-terminal which is the most secure option. However, when the payment (telecash) is transmitted from the payer's terminal (1) to the payee's terminal (2), the payee can send the payment to the host computer to the payee's account.

On the other hand when payer's terminal (1) monitors the payee's details and the payable bill and payer activates the payee's details (6), the bill (either together with the required amount of telecash or without it) can be sent via network to the host computer (4) where the payer, payee have accounts. Then the payer account is debited for the amount of the bill and then payer's and payee's terminals are acknowledged about the completion of the transaction or the lack of money (credit) in the payer's account. In this way payee's and payer's terminal first exchange information in order to know to which account the payment should be transferred. Then after receiving the payee's details by the payer's MWP (1) the network can be used to send the bill and/or required amount of telecash to the host computer (4), when required.

Figure 5:
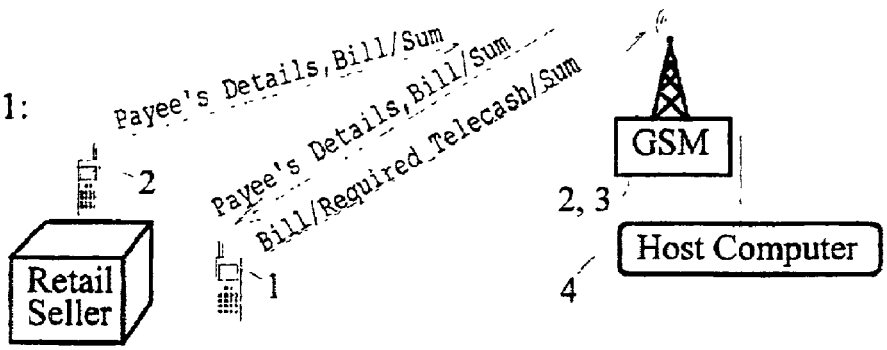
FIG. 5 presents four examples wherein payee's/payer's terminal exchange contact codes, account information, required amount of electronic money, perform bill payment and transactions in a connectionless, modemless, wireless and terminal-to-terminal way, or terminal-to-base station-to-terminal way, or terminal-to-terminal-to-host computer.
Figure 5:
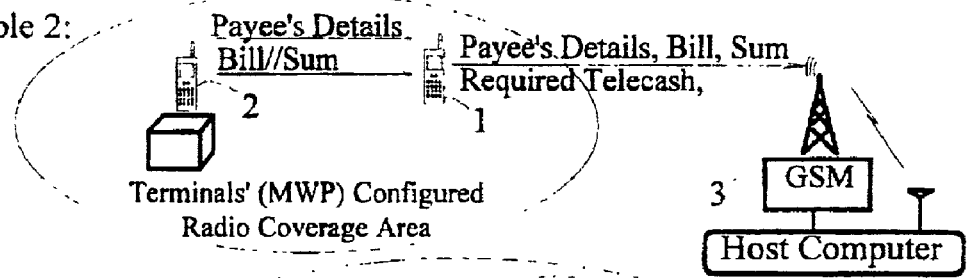
Figure 5:
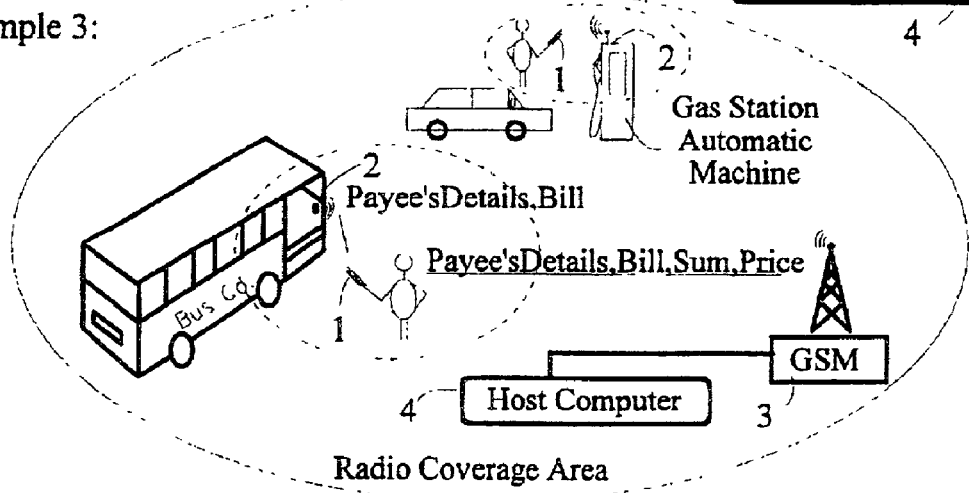
Figure 5:
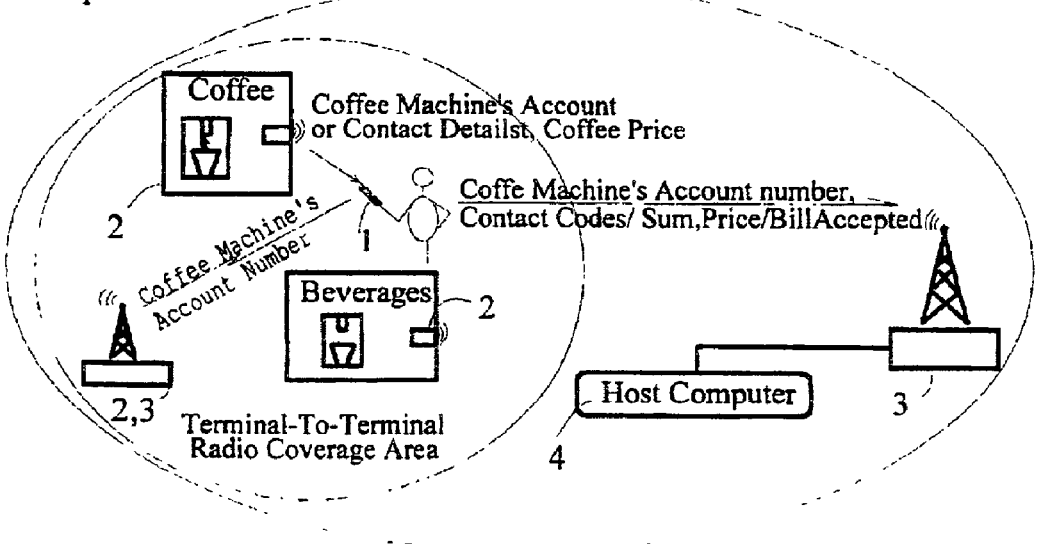

FIG. 5 presents four examples for payments in the service providers' environment. In example 1 the payee's terminal (2) broadcasts/sends the payee's details, bill (and purchase details if required) through the base stations (either payee's base station 2 or for example a GSM operator's base station 3) to the payer's MWP (1). The base stations can include the required controlling systems or they can be linked to the base stations' subsystem for controlling the base stations. Then payer activates the payee's details (account number) which also includes contact codes of the required host computer (e.g. www//OKObank.PizzaHut.fi or for example 3589435634528349). Then the bill and other required information is send to the host computer (4) where the required amount is transferred to the payee's account.

In example 2 of FIG. 5 the payee's details, payable bill and other required data are directly broadcast/sent from the payee's terminal (2) to the payer's MWP (1). Both terminals (1, 2) are under each other's radio coverage so that the information broadcasted/sent by payee's terminal is received by payer's MWP (1) without using the network (3). After this, the payer activates the payee's details, as explained above, and sends the bill to the host computer. In example 3 of FIG. 5 the service provider's details, for example, the gas station's or a bus company's account number, codes or other required information such as the price of petrol per litter or the price of ticket are broadcasted/sent to the payer's terminals (1). For example when payer wants to pay for petrol, he activates the service provider's details received by his terminal (1) and sends it to the host computer (4), then the host computer checks the payer's account and sends a message to the petrol station's terminal (2) indicating that the payer has the right (sufficient credit) to buy the petrol. After that payer has finished tanking his car, the terminal (2) sends the bill to the host computer (4) for debiting the payer's account for the amount of the petrol he has bought. Then the host computer (4) sends an acknowledgment message to both terminals (1, 2) indicating that the payment has been completed. On the other hand if the payer pays by telecash (electronic money), he can by activating the service provider's details (account number) send the amount (for example 10 dollars) to the petrol station's terminal (2) or host computer (4) which after the payer have the right to tank his car against 10 dollars paid. The payment can be paid in different ways but according to this invention user's MWP (1) receives the payee's details (account number, contact codes) directly from the payee's terminal (2) or via the base stations/network, and then activates the payee's details, upon which, the required telecash, bill is sent to the payee's terminal (2) or his account in the host computer (4). All automatic selling machines, gas stations (and other retail registers etc.) can be integrated with a wireless/cellular transmitter and receiver to provide a wireless/cellular payment service, in accordance with this invention, so that users can pay for their purchases and required services by using the inventive Mobile Wallet-Phone in a user friendly way without any need to establish a call or to use conventional money or different credit or debit cards. For instance the example 4 of FIG. 5 shows the automatic coffee machines (coffee maker and other automatic seller machines which are equipped with the inventive terminal (transmitter-receiver 2) to send the service provider's (the coffee seller machine) details and the coffee's price, for example continuously or whenever the customer appears in front of the machine or activates a button on the machine. Then the customer (payer) activates the received payee's (the coffee seller's) details in his MWP and sends the bill (accepted price) or the required telecash to the coffee machine's terminal (2) or to the host computer (4) to be transferred to the payee's account. Then after that the payment has been completed, the coffee machine offers a cup of coffee to the payer. Any other service can be paid in a same way as above-mentioned examples or other alike procedures by using inventive method and terminals (1, 2), and when required, base stations (2, 3), host computer (4) and the network (3).

Figure 6:
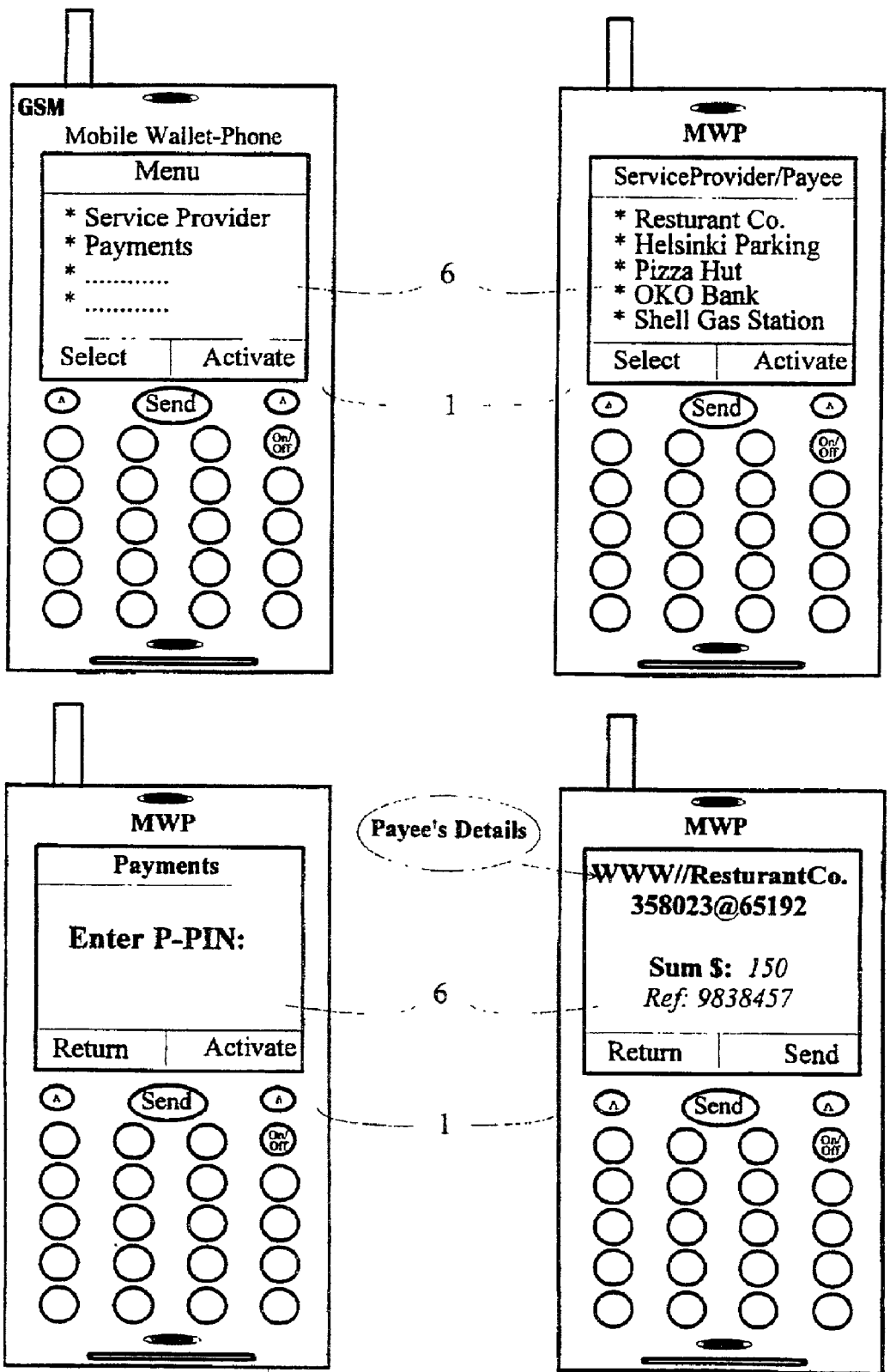
FIG. 6 is a top view of the terminal in accordance with one embodiment of the present invention.

FIG. 6 shows a top view of the user's Mobile Wallet-Phone (MWP) in accordance with one embodiment of this invention. In one embodiment of this invention user activates the command "payments" which after the MWP prompts the user to enter the P-PIN code "Enter P-PIN". After that, the user's device (for example mobile telephone, pager etc.) becomes a MWP by which the user can perform purchase and bill payments and send/receive telecash. In another embodiment of this invention when the user activates a command for example "service provider" the MWP listens to the radio interface (available base stations/other terminals) or requests the network/host computer (3, 4) to send the service providers details (account number, codes etc.) and when needed the bill or bill format which after the MWP (1) monitors the details on its screen (6) for the user. The service provider also sends (whenever required) the bill which should be paid by the payer. The payer can then activate the service providers details and send a message, bill or the required amount of telecash to the host computer or the payee's terminal.

The user P-PIN code can be changed using the same method which is used in mobile phones to change the PIN code. According to the invention the user's terminal/smart card (SIM) includes the required software (or the required software can be down-loaded to the terminal whenever needed) for the process of P-PIN entering and authentication.

The user's MWP (1) can be made in different shapes and sizes. For example, the user's watch can be integrated with a wireless message receiver (pager) and transmitter which can be used for performing user's payments by using the inventive method. For example at a cash register when the customer wants to pay for his shopping, the bill (the sum to be paid) can be received by the customer's watch. Then the customer can by activating the payee's details (contact and/or account codes and number) send the bill (with the required amount of telecash, if required) to the shop's cash register (terminal 2) or host computer.

The payment method presented in this invention can be based on an open platform and can be used in different terminals (mobile phone, pagers etc.) and implemented in different scales. Furthermore, for example all products in shops can be labeled with a tag/card which transmits/radiates the product's details such as name and price, and the service provider's (for example the shop keeper's) account number continuously so that when the user's MWP's antenna is quite near to the mentioned card/label or when the tag/card is touched by said antenna then the user's MWP receives the required information, as mentioned already. In this way the user can collect all his needed goods and their information in his MWP, and then send the payment/bill to the host computer (4) or payee's terminal (2). Therefore, there will be no need for the existing cash registers. The cashiers' work can be directed to advice the customers (for finding the needed products etc.) thus providing a better quality service rather than sitting behind the cash register desks and doing a boring job.

Figure 7:
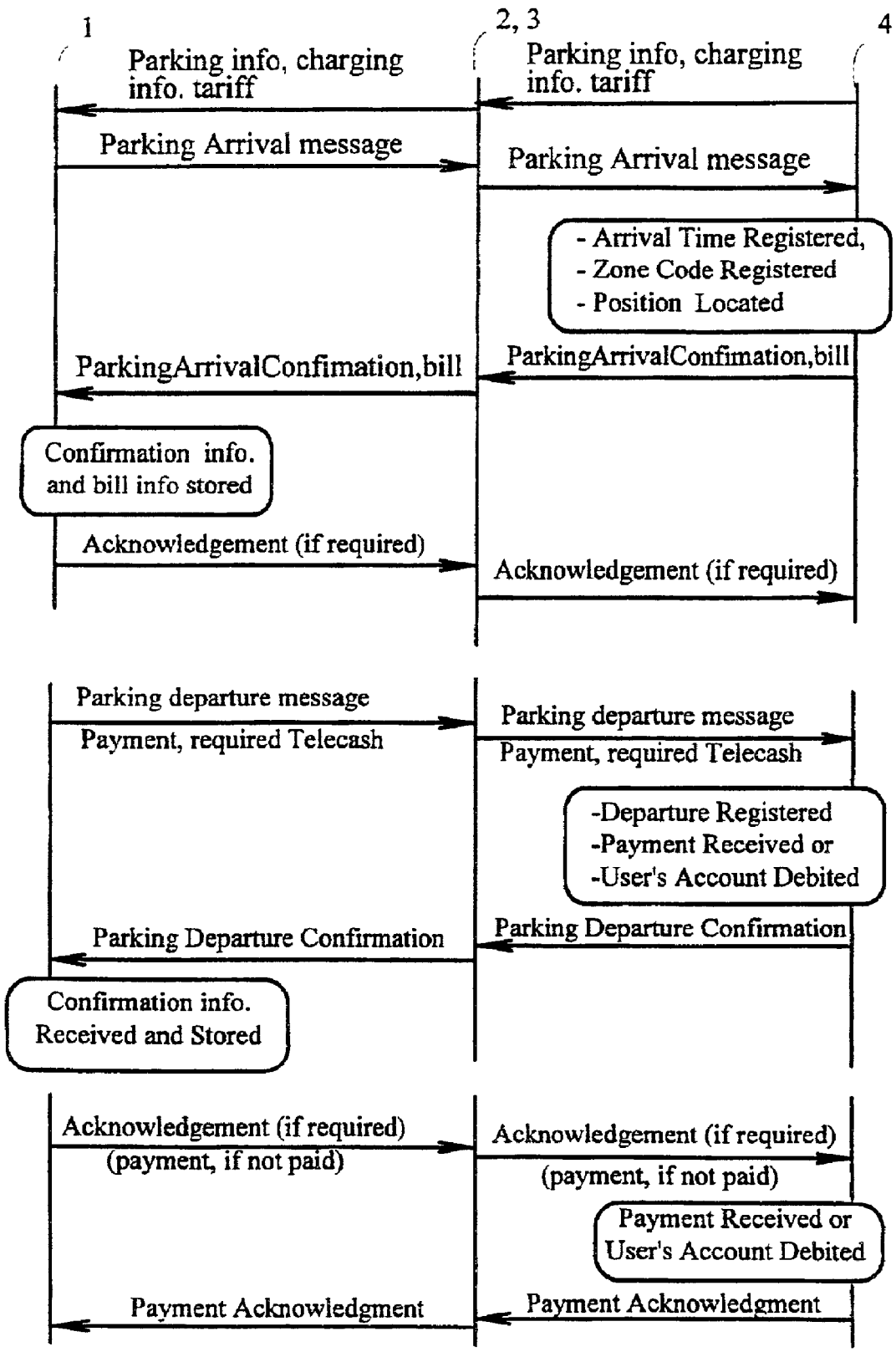
FIG. 7 presents an example of a connectionless method for parking payments, in accordance with the present invention.
Figure 8:
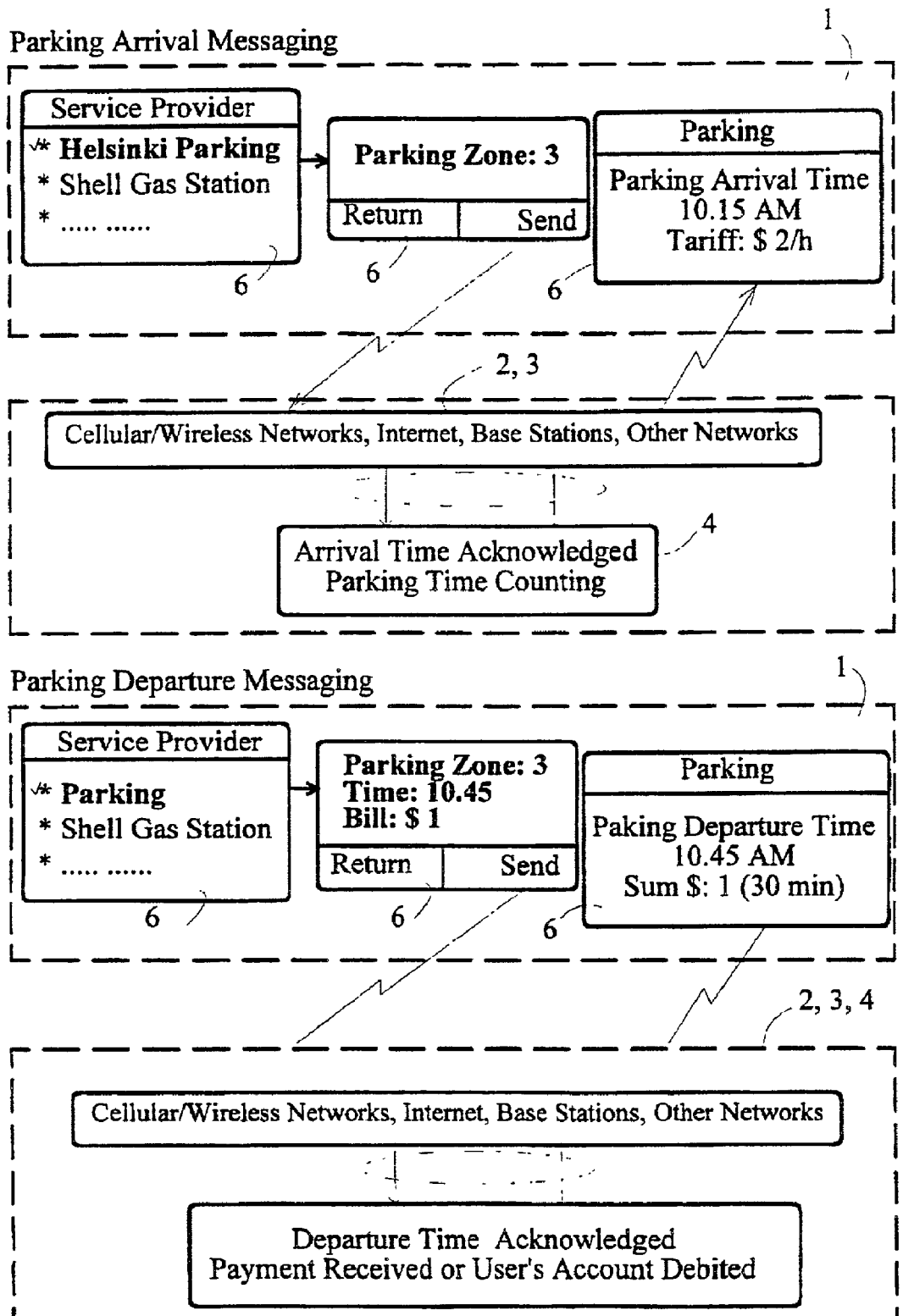
FIG. 8 presents an example of a connectionless method for parking reservation, in accordance with the present invention.

In accordance to one embodiment of this invention the transmitting/broadcasting of the payee's/service provider's details can be a location-based action. For example when the payee's and payer's terminals are in the range of each other's radio coverage, they can monitor each other's details (the user's account number, codes etc.). On the other hand the location of the payer can be located when the payer's terminal is under the radio coverage of the payee's terminal/base station, for example, when the payer is under the coverage of the base station of a petrol station, the required signaling can take place between the user MWP and the petrol station's base station system so that the base station system notices that a user is coming to get the service. Then the base station can send/broadcast the required information to the user's terminal. The location defining can be also taken place without any signaling between the terminal and base stations. The location positioning can be a cell-based or an exact location positioning option. When the user's MWP is under the service provider's terminal/base stations radio coverage, the user's MWP can monitor the service provider's terminal's/base station's transmitting/broadcasting information, including the payee's details (account or contact codes and number, charging details etc.). For example FIGS. 7 and 8 presents a flow chart of a parking system where the parking service provider's base station transmits/broadcasts charging information, parking zone details and other required information based on the city's different zones/areas. The user can then activates the service provider's details under a command "parking" which is monitored by his mobile terminal (or is stored in his mobile terminal or its SIM card) and if required enters the parking zone number (if the zone number is not sent by the base stations or the host computer) into his terminal and sends the message to the host computer for getting the right to use the parking space. The charging can be an account-based or telecash-based option so that when the user collects his car from the parking space a message (including also the required amount of telecash, if needed) which can be any message is sent by his mobile terminal to the parking data base where the user's account is debited or the received telecash is transferred to the service provider's account. The parking time can be counted in the user's terminal (for example after receiving an arrival acknowledgment message from the host computer) or in the host computer, depending on either the user pays for his parking by telecash or his account must be debited.

Figure 9:
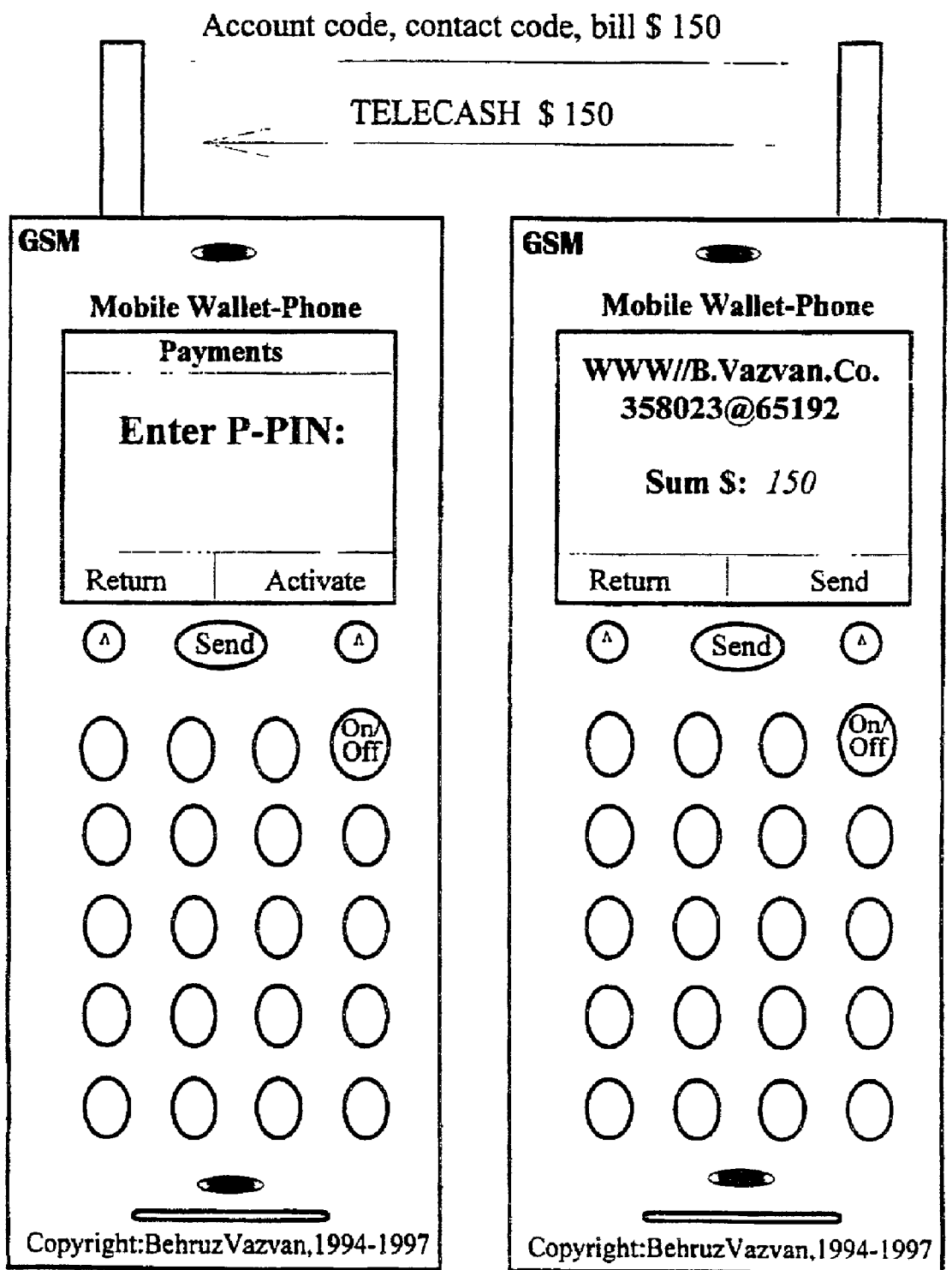
FIG. 9 presents two Mobile Wallet-Phones which can send and receive information, account numbers, contact codes, required amount of telecash (i.e. electronic money) and exchange other required data directly with each other under their own adjustable radio coverage without using the network, in accordance with one embodiment of the present invention.

FIG. 9 presents two Mobile Wallet-Phones which are able to configure an adjustable radio coverage within which, they can send and receive their users' details (account number, codes etc.) and the required telecash. The MWP's radio coverage for this purpose can be adjusted within a range of, for example, few millimeters to few meters or more. When for example the payer's MWP (1) is in the payment mode (which means the terminal is operating as electronic wallet and is able to send and receive the required account number and telecash) the user can send the required amount of telecash to the payee's MWP (2) or to the payee's account in the host computer. For example, when the payer's MWP (1) receive the payee's details, he can enter a number equal to the required amount of telecash (for example 10 dollars) he wants to pay to the payee then by activating the payee's details the terminal (1) sends the required amount of telecash to the payee's MWP (2) or to the host computer. The payee can send also the bill, required to be paid by the payer, to the payer's MWP (1). In that case the payer does not need to enter anything in his MWP but just accept the bill and send it to the payee's terminal or the host computer.

In accordance to another embodiment of this invention the payer sends a message (any message, for example an empty short message, including a letter for example) to the payee's terminal (whenever the payer activates the contact number/codes or account number of the payee) in order to receive the bill. For example when the customer is near the cash register he can enter the cash register's contact number into his MWP or his MWP monitors the cash register's terminal's (2) broadcasting contact number. Then the message is sent to the cash register's terminal and indicates who is the message sender because the message includes the senders details (contact number). The message sender's contact number can be sent directly from the sender's MWP or from the network (for example short message center, switches or other network component) or from the host computer (for example the shop's host computer via which the message goes to the cash register's terminal, and wherein the payer can have an account). Then cashier activates the payer's contact codes (by activating "Send" button, for example) upon which the bill or the sum to be paid by the payer is sent to the payer's terminal. Then the payer activates the payee's account or contact codes or the host computer's contact codes which after the bill (sum to be paid) and/or the required telecash is sent to the payee's terminal or the required host computer (located in the service provider's service area or in the bank or in the network). Then the telecash is transferred to the payee's account (if it is not sent directly to the payee's terminal) or the payer account is debited. If the terminal-to-terminal payment is not taken place, that is, the payment is completed in the host computer, then the host computer sends the required messages to the payee's and payer's terminals to acknowledge the completion of the payment.

In this invention the users terminals (1, 2) can operate as the switches and base stations to each other since in one embodiment of this invention said terminals can transmit to each other any required information without using the network. Therefore, the network's capacity is not wasted when users are near to each other (as usually for example to pay in the shops the payer is near to the payee). Depending on the air interface protocol used for terminal-to-terminal communication, for (short) messaging terminals (1, 2) do not necessarily need to have any signaling or be synchronized. But when required terminals (1, 2) can have required signaling and if required be synchronized. For example payer's terminal (1) listens to the air interface and receives the signals for example from payee's terminal (2). Then the communication between the terminals can be synchronized (in case of CDMA systems, synchronization is not necessary; CDMA: Code Division Multiple Access) on terminal-to-terminal basis without using the network. Then payer's terminal (1) can transfer the information received from the payee's terminal (2) to any other terminal either directly or via network.

The users' MWPs can at the same time operate as the user's mobile phone and electronic wallet. For example the terminal can be a dual-mode or a single-mode (dual-band), for example a GSM-DECT dual-mode terminal that in accordance to this invention can operate so that when user is shopping the DECT part of the terminal operates as user's wallet for purchase payment, and the GSM part for telephone calls. The term GSM stands for Global System for Mobile Communication, the term DECT stands for Digital European Cordless Telecommunications. The terminal (1, 2) can operate both in a wireless local loop and under the wide area wireless networks. The user's purchase payments, bills, telephone calls and all kind of payments can be paid by his MWP. By utilizing this invention there will remain no possibility to produce false money, because user does not need to use any conventional money, since the user's MWP acts as his empty wallet without any conventional money. The user's smart card can be a separate card or his SIM card which can be reloaded with the required amount of telecash. On the other hand user's money can be only kept in his account and the required bills be sent to the host computer (4) where the payer's account can be debited. In this invention the user can be both the payee and the payer. The user can reload his smart card/terminal over the air interface with the required amount of telecash. For example user can transfer the required amount of electronic money (telecash) from his account in the host computer (4) to his terminal's (1) smart card whenever required. In this invention in order to load the user's terminal's smart card with the required telecash any communication protocols (either packet switched or circuit switched means) can be used. In this invention the payee's/service provider's details (account number, codes, contact codes) can be broadcast/sent to all or a group of users (terminals 1) or to the required terminal, which are roaming under the radio coverage of the payee's/service provider's base station or terminal (2) or the network's base station (3).

In this invention the user's MWP (1) uses the wireless/cellular digital communication messaging means without using any modem for communication between the users' MWPs and host computer, network or other terminals. The terminal (2) can be also a fixed or portable terminal such as personal computer or television using both wireless and internet networks. The inventive method can be used in both wireless and internet networks.

The users' terminals (1, 2) can be used in any wireless/cellular network such as GSM, PCS, DCS, CDMA, DECT, PHS, ERMES, FLEX and internet. The user's details and payment messages can be send via messaging means of wireless networks such as short message or paging networks, and via internet or via signaling means of networks and MWPs. The user's MWP can be any standard mobile phone and pager by which the inventive method can be utilized. The host computer (2) can include the users' data and accounts or be connected to the users' bank accounts or be logically integrated into any component of the network (3). The user data, for registration and authentication in the terminal or into network or host computer can be the same as the user subscription data (if users use subscription related services, and if required). For example if the telecommunications services are subscription free then the user authentication can take place only between the user, his smart card and terminal. The user can pay for his telephone calls while he is on move (pay-as-you-go) or per each call.

The described embodiments of the invention are only considered to be preferred and illustrate of the inventive concept, the scope of the invention is not to be restricted to such embodiments. Various and numerous other arrangements may be devised by one skilled in the art without departing from the sprit and scope of this invention.

It is therefore intended by the appended claims to cover any and all such applications, modifications and embodiments within the scope of the present invention.

What is claimed is:

1. A method, comprising:
   generating with a computer a set of subscriber-specific authentication data blocks into a network, each data block containing a challenge, a response and a key, where the generation is performed in the same manner as in a known mobile communications system;
   transmitting with a transmitter at least some of the challenges contained in the authentication data blocks to a terminal;
   choosing one of the challenges for use in the terminal, and based on the challenge, determining a response and a key to be used with an aid of an identification device of the terminal essentially in the same way as in a subscriber identification module of the mobile communication system;
   determining an authenticator with an aid of the chosen key in the terminal;
   transmitting, from the terminal to the network, the authenticator and data, the data containing information relating to the manner in which the authentication is formed and notifying the network with the aid of the data of which key corresponding to which challenge was chosen, and a check value with the aid of the chosen key in the network; and
   comparing the check value with the authenticator.

2. The method as defined in claim 1, where the data is a security parameter index in the registration message of a mobile internet protocol.

3. The method as defined in claim 1, where the value of the response determined at the terminal is inserted into the data.

4. The method as defined in claim 1, where the challenges are sorted in an order at the terminal with the aid of predetermined sorting criteria and a consecutive number corresponding to the chosen challenge is inserted into the data.

5. The method as defined in claim 1, where the identification device used in the terminal is a subscriber identity module used by a global system for mobile communication system and the authentication data blocks are authentication triplets used by the global system for mobile communication system.

6. The method as defined in claim 5, where the authentication triplets are fetched from an authentication center of the global system for mobile communication system.

7. The method as defined in claim 6, where the challenges to be transmitted to the terminal are transmitted by using a short message switching service.

8. the method as defined in claim 1, where the challenges to be transmitted to the terminal are transmitted in an internet protocol datagram to be sent through an internet protocol network.

9. The method as defined in claim 1 for an internet protocol network, where the authentication data blocks are transmitted to a home agent of the terminal and with the aid of a data message the home agent is informed about which key corresponding to which challenge was chosen, where the check value is determined in the home agent.

10. A system, comprising:
    in a terminal of a network, a first message transmission unit that is programmed to transmit an authenticator and data to the network, the data including information relating to the manner in which the authenticator is formed; and
    a checking device that is programmed to determine a check value with aid of the data,
    where
    the terminal of the network comprises an identification device, which receives as input a challenge from which a response and a key are defined substantially in a same manner as in a subscriber identity module of a known mobile communications system,
    the system includes a generating device that is programmed to generate authentication data blocks in the same manner as in the mobile communications system, the authentication data blocks include a challenge, a response and a key,
    the system includes a transmission device that is programmed to transmit challenges contained by the authentication data blocks to the terminal,
    the terminal includes a selection device that is programmed to select one challenge for use,
    the first message transmission device inserts a value into the data which indicates which key corresponding to which challenge was selected for use in the terminal, and
    the first message transmission device determines the authenticator and the checking device determines the check value based on the selected key.

11. The system as defined in claim 10, where the identification device located in connection with the terminal is a subscriber identity module used in the mobile communications system.

12. The system as defined in claim 10, where the generating device includes an authentication center of the mobile communications system.

13. The system as defined in claim 10, where the transmission device comprises a device for carrying out a short message switching service.

14. A method, comprising:
    generating with a computer a set of subscriber-specific authentication data blocks, each authentication data block containing a challenge, a response and a key;
    transmitting with a transmitter at least some of the challenges contained in the authentication data blocks to a terminal;
    choosing one of the challenges for use in the terminal, and based on the challenge, determining a response and a key to be used with an aid of an identification device of the terminal;
    receiving an authenticator and data containing information relating to a manner in which the authenticator is formed from the terminal;
    determining based on said data which challenge was chosen by the terminal; and
    determining a check value with the key corresponding to the chosen challenge, said check value to be compared with the authenticator.

15. The method as defined in claim 14, where said data is a security parameter index in a registration message of a mobile internet protocol.

16. The method as defined in claim 14, where said data comprises the response corresponding to the chosen challenge.

17. A method, comprising:
    receiving with a receiver a set of challenges from a telecommunications network, where each one of the challenges is contained in an authentication data block comprising said one of said challenges, a response and a key;
    choosing one challenge from the set of challenges;
    determining a response and a key based on the chosen challenge;
    determining an authenticator based on the key corresponding to the chosen challenge;
    transmitting with a transmitter said authentication and data to the telecommunications network, said data relating to the manner in which the authenticator if formed; and
    notifying the telecommunications network of the chosen challenge, where a check value is determined with the key corresponding to the chosen challenge and said check value is compared with the authenticator.

18. The method as defined in claim 17, where said data is a security parameter index in a registration message of a mobile internet protocol.

19. The method as defined in claim 17, where said data comprises the response corresponding to the chosen challenge.

20. An apparatus comprising:
    a generator that is programmed to generate a set of subscriber-specific authentication data blocks, each authentication data block containing a challenge, a response and a key;
    a transmitter that is programmed to transmit at least some of the challenges contained in the authentication data blocks to a terminal;
    a processor that is programmed to choose one of the challenges for use in the terminal, and based on the challenge, to determine a response and a key to be used with an aid of an identification device of the terminal;
    a receiver that is programmed to receive an authenticator and data containing information relating to a manner in which the authenticator is formed;
    a first determiner that is programmed to determine based on said data which challenge was chosen by the terminal; and
    a second determiner that is programmed to determine a check value with the key corresponding to the chosen challenge, said check value to be compared with the authenticator.

21. The apparatus as defined in claim 20, where the data is a security parameter index in a registration message of a mobile internet protocol.

22. The apparatus as defined in claim 20, where the value of the response determined at the terminal is inserted into the data.

23. The apparatus as defined in claim 20, where the challenges are sorted in an order at the terminal with the aid of predetermined sorting criteria, and a consecutive number corresponding to the chosen challenge is inserted into the data.

24. The apparatus as defined in claim 20, where the challenges to be transmitted to the terminal are transmitted in an internet protocol datagram to be sent through an internet protocol network.

25. An apparatus, comprising:
a receiver that is programmed to receive a set of challenges from a telecommunications network, where each one of the challenges is contained in an authentication data block comprising said one of said challenges, a response and key;
a selector that is programmed to choose one challenge from the set of challenges;
a first determiner that is configured to determine a response and a key based on the chosen challenge;
a second determiner that is programmed to determine an authenticator based on the key corresponding to the chosen challenge; and
a transmitter that is programmed to transmit said authenticator and data to the telecommunications network, said data relating to the manner in which the authenticator is formed and to notify the telecommunications network of the chosen challenge, where a check value is determined with the key corresponding to the chosen challenge and said check value is compared with the authenticator.

26. The apparatus as defined in claim 25, where the data is a security parameter index in a registration message of a mobile internet protocol.

27. The apparatus as defined in claim 25, where the value of the response determined at the terminal is inserted into the data.

28. The apparatus as defined in claim 25, where the challenges are sorted in an order at the terminal with the aid of predetermined sorting criteria, and a consecutive number corresponding to the chosen challenge is inserted into the data.

29. The apparatus as defined in claim 25, where the challenges transmitted to the terminal are transmitted by using a short message switching service.

30. The apparatus as defined in claim 25, where the challenges transmitted to the terminal are transmitted in an internet protocol datagram through an internet protocol network.

31. An apparatus, comprising:
generating means for generating a set of subscriber-specific authentication data blocks into the network, each data block containing a challenge, a response and a key, where the generation is performed in the same manner as in a known mobile communications system;
transmitting means for transmitting at least some of the challenges contained in the authentication data blocks to the terminal;
choosing means for choosing one of the challenges for use in the terminal, and
based on the challenge, determining a response and a key to be used with an aid of an identification unit device of the terminal essentially in the same way as in a subscriber identification module of the mobile communication system;
determining means for determining an authenticator with an aid of the chosen key in the terminal;
transmitting means for transmitting from the terminal to the network authenticator and data, the data containing information relating to the manner in which the authentication if formed and notifying the network with the aid of the data of which key corresponding to which challenge was chosen, and a check value with the aid of the chosen key in the network; and
comparing means for comparing the check value with the authenticator.

32. An apparatus, comprising:
receiving means for receiving a set of challenges from a telecommunications network, wherein where each one of the challenges is contained in an authentication data block comprising said one of said challenges, a response and a key;
choosing means for choosing one challenge from the set of challenges;
determining means for determining a response and a key based on the chosen challenge;
determining means for determining an authenticator based on the key corresponding to the chosen challenge;
transmitting means for transmitting said authenticator and data to the telecommunications network, said data relating to the manner in which the authenticator is formed; and
notifying means for notifying the telecommunications network of the chosen challenge, where a check value is determined with the key corresponding to the chosen challenge and said check value is compared with the authenticator.

33. A computer program embodied on a computer-readable medium, where execution of the computer program controls at lease one processor to perform:
generating with said at lease one processor a set of subscriber-specific authentication data blocks into a network, each data block containing a challenge, a response and a key, where the generation is performed in the same manner as in a known mobile communications system;
transmitting with a transmitter at least some of the challenges contained in the authentication data blocks to a terminal;
choosing one of the challenges for use in the terminal, and based on the challenge, determining a response and a key to be used with an aid of an identification device of the terminal substantially in the same way as in a subscriber identification module of the mobile communication system;
determining an authenticator with an aid of the chosen key in the terminal;
transmitting with a terminal transmitter, from the terminal to the network, the authenticator and data,
the data containing information relating to the manner in which the authentication is formed and notifying the network with the aid of the data of which key corresponding to which challenge was chosen, and a check value with the aid of the chosen key in the network; and
comparing the check value with the authenticator.

34. A computer program embodied on a computer-readable medium, where execution of the computer program controls at least one processor to perform:
generating with said at least one processor a set of subscriber-specific authentication data blocks, each authentication data block containing a challenge, a response and a key;
transmitting with a transmitter at least some of the challenges contained in the authentication data blocks to a terminal;

choosing one of the challenges for use in the terminal and based on the challenge, determining a response and a key to be used with an aid of an identification of the terminal;

receiving with a receiver an authenticator and data containing information relating to a manner in which the authenticator is formed from the terminal;

determining based on said data which challenge was chosen by the terminal; and determining a check value with the key corresponding to the chosen challenge, said check value to be compared with the authenticator.

35. A computer program embodied on a computer-readable medium, where execution of the computer program controls at least one processor to perform:

receiving with a receiver a set of challenges from a telecommunications network, where each one of the challenges is contained in an authentication data block comprising said one of said challenges, a response and key;

choosing with said at least one processor one challenge from the set of challenges;

determining a response and a key based on the chosen challenge;

determining an authenticator based on the key corresponding to the chosen challenge;

transmitting with a transmitter said authenticator and data to the telecommunications network, said data relating to the manner in which the authenticator is formed; and notifying the telecommunications network of the chosen challenge, where a check value is determined with the key corresponding to the chosen challenge and said check value is compared with the authenticator.

* * * * *

UNITED STATES PATENT AND TRADEMARK OFFICE
CERTIFICATE OF CORRECTION

| | |
|---|---|
| PATENT NO. | : 7,660,772 B2 |
| APPLICATION NO. | : 09/751138 |
| DATED | : February 9, 2010 |
| INVENTOR(S) | : Verkama |

It is certified that error appears in the above-identified patent and that said Letters Patent is hereby corrected as shown below:

Claim 10, col. 13, line 21 delete "unit".

Claim 31, col. 15, line 60 delete "unit".

Claim 31, col. 16, line 2 delete "if" and insert --is--.

Claim 33, col. 16, line 33 delete "lease" and insert --least--.

Claim 33, col. 16, line 34 delete "lease" and insert --least--.

Signed and Sealed this

Twentieth Day of April, 2010

David J. Kappos
*Director of the United States Patent and Trademark Office*